United States Patent [19]
Rowse et al.

[11] Patent Number: 5,645,184
[45] Date of Patent: Jul. 8, 1997

[54] AIRCRAFT CARGO CONTAINER

[75] Inventors: David Paul Rowse; Debra Anne Sewell, both of Bristol; Jan Anthony Booth, Lancashire; Rob William Ince, Swindon, all of Great Britain

[73] Assignee: Royal Ordnance Public Limited Company, Lancashire, Great Britain

[21] Appl. No.: 220,596

[22] Filed: Mar. 31, 1994 Foreign Application Priority Data

Related U.S. Application Data

[63] Continuation-in-part of PCT/GB92/02379, Dec. 22, 1992 published as WO93/12997, Jul. 8, 1993.

[30] Foreign Application Priority Data

Dec. 24, 1991 [GB] United Kingdom ............. 9127408

[51] Int. Cl.⁶ .................................................. B65D 90/02
[52] U.S. Cl. ........................ 220/1.5; 220/88.1; 220/454
[58] Field of Search .................................. 220/88.1, 1.5, 220/443, 454, 666, 442

[56] References Cited

U.S. PATENT DOCUMENTS

| | | | |
|---|---|---|---|
| 3,567,536 | 3/1971 | Wickersham, Jr. ............ | 220/88.1 |
| 3,739,731 | 6/1973 | Tabor .......................... | 220/454 |
| 3,908,851 | 9/1975 | Jacobs ......................... | 220/454 |
| 3,917,104 | 11/1975 | Rossitto et al. ............... | 220/454 |
| 4,018,983 | 4/1977 | Pedlow ......................... | 220/88.1 |
| 4,046,186 | 9/1977 | Nordstrom .................... | 220/1.5 |
| 4,750,631 | 6/1988 | Hastings et al. .............. | 220/88.1 |
| 4,889,258 | 12/1989 | Yerushalmi ................... | 220/454 |
| 5,267,665 | 12/1993 | Sanai et al. .................. | 220/88.1 |
| 5,360,129 | 11/1994 | Lee .............................. | 220/1.5 |

*Primary Examiner*—Stephen J. Castellano
*Attorney, Agent, or Firm*—Cushman, Darby & Cushman IP Group of Pillsbury Madison & Sutro LLP

[57] ABSTRACT

An aircraft cargo container (10) is provided with one or more expandable regions for expansion under blast loading thereby to absorb a portion of the blast energy from a blast within the container (10). The absorbing means may comprise corrugated or concertina shaped sheets (20, 22, 34) which expand under blast loading and together with a blast absorbing material (24). The sheets (20, 22, 34) and material (24) may be provided in one or more panels (12, 14) and/or at one or more edged if required.

5 Claims, 7 Drawing Sheets

AIRCRAFT CARGO CONTAINER

This is a Continuation-in-Part of application no. PCT/GB92/02379 filed Dec. 22, 1992, published as WO93/12997, on Jul. 8, 1993.

FIELD OF THE INVENTION

The present invention relates to a container and relates particularly, but not exclusively, to an aircraft cargo container which is capable of expanding thereby to facilitate containment of an explosive blast therein.

BACKGROUND OF THE RELATED ART

Blast mitigating panels for cargo containers have a tendency to 'bow' outwards when an explosive charge is detonated inside the container. The panels often fail at their edges and corners where they are attached to each other or to a frame, before the material of the panel fails.

The longer a blast can be contained, and the more expandable the container, the greater the energy the blast wave has to expend in disrupting the cargo container. The consequence of a longer containment time is expected to be a reduction in impulse loading and any emerging wave is less energetic when it interacts with the structure of the aircraft.

There therefore exists a requirement for a cargo container capable of absorbing a significant proportion of the explosive blast energy from an explosion thereby to reduce impulse loading on an aircraft structure.

Techniques investigated by British Aerospace Plc's Sowerby Research Centre have illustrated that the following apparatus could provide a cargo container which reduces and possibly eliminates the above mentioned problems.

SUMMARY OF THE INVENTION

Accordingly, the present invention provides a container formed from a plurality of panels and having a blast attenuation means, said attenuation means comprising one or more expandable regions for expansion under blast loading thereby to absorb a portion of the blast energy contained in the blast.

Advantageously, the expandable region comprises and/or incorporates a non-planar member.

Preferably, the one or more expandable regions comprises a corrugated or concertina shaped panel having laterally expanding portions which in operation expand to allow the container to expand before structural failure occurs.

In a particularly advantageous arrangement, each expandable region comprises two panels arranged the one on the other in substantially parallel relationship and defining a gap therebetween.

For a better blast mitigation, the panels are arranged the one on the other in out of phase relationship.

In one arrangement, each expandable region comprises two panels each having a substantially flat end portion arranged to overlap the substantially flat end portion of the other in a manner which allows sliding of one panel over the other.

The panel may be perforated thereby to allow a portion of the blast energy to pass therethrough.

In a particularly advantageous arrangement, the container includes a blast absorbing, deformable or crushable material on a surface of the panel for absorbing a portion of the blast energy.

In an alternative arrangement, the blast absorbing deformable or crushable material may be provided between the panels and/or on a surface of one or both of said panels.

In a particularly convenient arrangement, the container includes first and second backing sheets between which an expandable region is contained.

The first and second backing sheets could form the inner and outer surfaces of the container. The blast attenuation means could form part of, or all of, one or more said panels. Alternatively, the blast attenuation means could form one or more jointing portions between one or more of said panels.

In a particularly strong arrangement, the container may include a plurality of panels arranged the one on top of the other and the corrugations or concertinas of each extending in a direction substantially orthogonal to each other.

The wavelength of the non-planar member may vary between panels thereby to facilitate progressive failure of the container.

The corrugations or concertinas may form concentric rings around a central point such as the centre of the panel, its corner or a point adjacent to the edge of the panel thereby to facilitate maximum extension of the panel at the points of maximum blast load.

One or more friction elements in the form of, for example, a pair of corners between which said panels are frictionally engaged may be provided. Adhesives or fasteners, such as rivets or nut/bolt assemblies, may be used to Join the corners to the panels. Slots may be provided at an edge of the panels through which said fastners pass.

The blast attenuation means may form one or more jointing portions between one or more of said panels or may form a jointing portion along the entire length of each edge of a panel so as to form a container having a bellows like structure.

In an alternative form, the one or more expandable regions may comprise a panel or panels of woven or knitted fabric material. The material may be encapsulated in a matrix of, for example, polymeric resin or an elstomer and could be an epoxy resin. The fibres are preferably high tensile strength fibres such as, for example, aramid or glass or a combination thereof.

The one or more expandable regions may comprise two or more parallel panels of woven or knitted fabric material arranged one on top of the other and each having different load versus elongation characteristic.

BRIEF DESCRIPTION OF THE DRAWINGS

The present invention will now be more particularly described by way of example only with reference to the accompanying drawings, in which.

DESCRIPTION OF THE PREFERRED EMBODIMENTS

Figure 1:
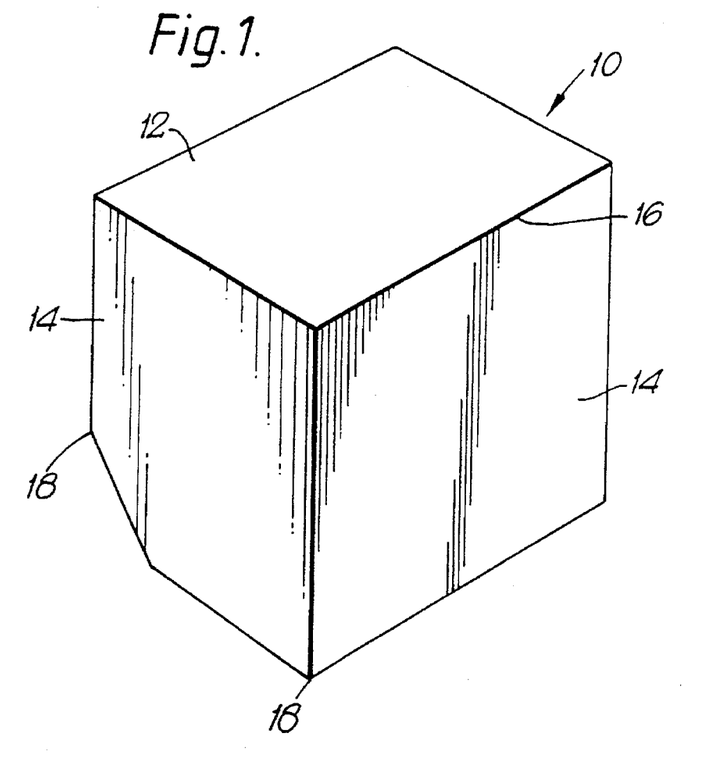
FIG. 1, is a pictorial representation of an aircraft cargo container according to one aspect of the present invention.

Referring to FIG. 1, a conventional aircraft cargo container 10 comprises a top panel 12, four side panels 14 and a base (not shown), Joined to each other at edges and corners 16, 18 respectively.

Figure 2:
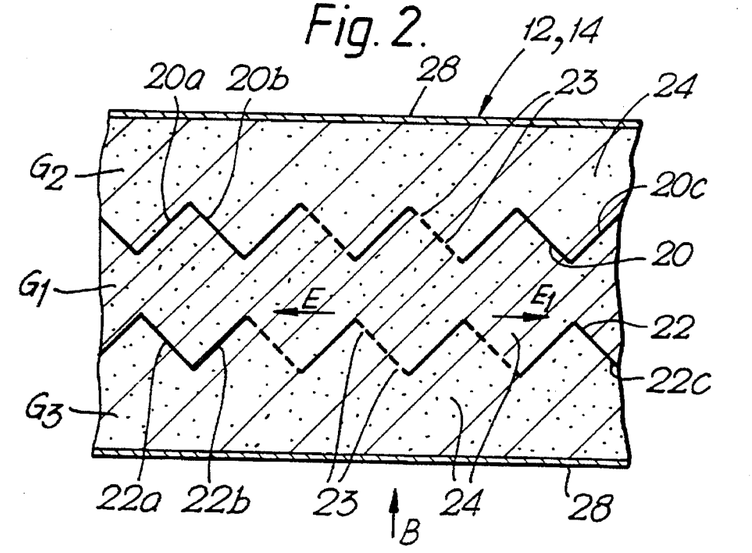
FIG. 2, is a cross sectional view of one of the panels shown in FIG. 1.

FIG. 2 illustrates, in cross-sectional form, the internal construction of one of the panels 12, 14, shown in FIG. 1. The panel 12, 14 comprises one or more corrugated or concertina shaped sheets 20, 22 having laterally expanding portions 20a, 20b and 22a and 22b respectively. When a plurality of sheets are provided they are preferably arranged substantially parallel to each other so as to define a gap G therebetween. The sheets may be arranged in phase or out of phase with each other in order to optimise the blast absorbing properties thereof. An out of phase relationship is shown in FIG. 2. One or other, or both, sheets may be perforated by holes 23 in order to allow a portion of the blast energy to pass therethrough for reasons which will be explained later. The gap G between the sheets 20, 22 is preferably provided with a packing of blast absorbing deformable or crushable material 24 which may also be provided on outer surfaces of the sheets as well if required. Whenever the blast absorbing material 24 is provided on the outer surfaces a protective backing sheet of, for example, metal 28 may be provided thereover in order to protect the material 24 from unnecessary damage during handling and further enhances the blast absorbing properties of the panel 12, 14. The ends 20c, 22c may be anchored to another member (not shown) if desired.

Figure 3:
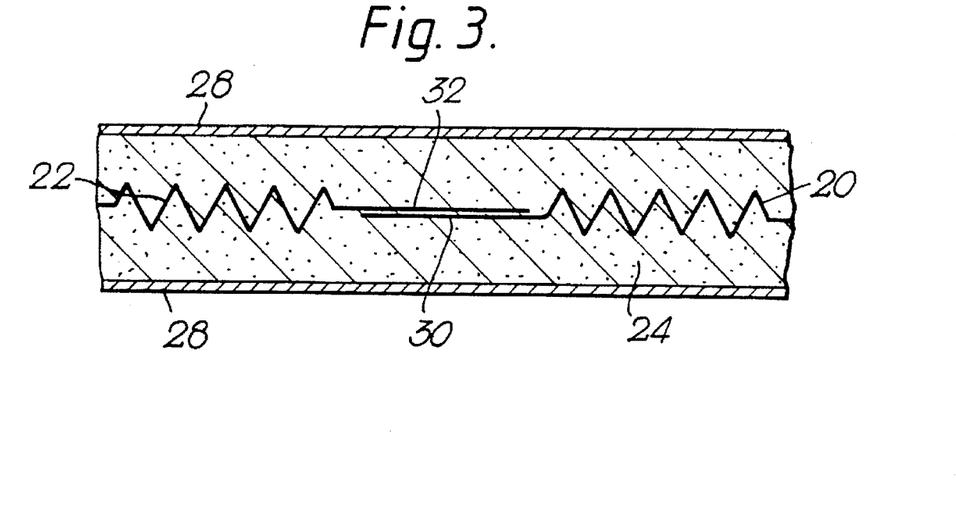
FIG. 3 is a cross-sectional view of an alternative form of one of the panels shown in FIG. 1.

Referring now to FIG. 3, in which an alternative form of the panel is shown, the sheets 20, 22 may be provided with an extended end portion 30, 32 arranged to overlap each other as shown. Such an arrangement has the advantage of enhancing the blast absorbing capabilities of the panel as will be described later and helps reduce the width of the panel itself. Blast absorbing material 24 is placed between the sheets 20, 22 and protective outer surfaces 28.

Figure 4:
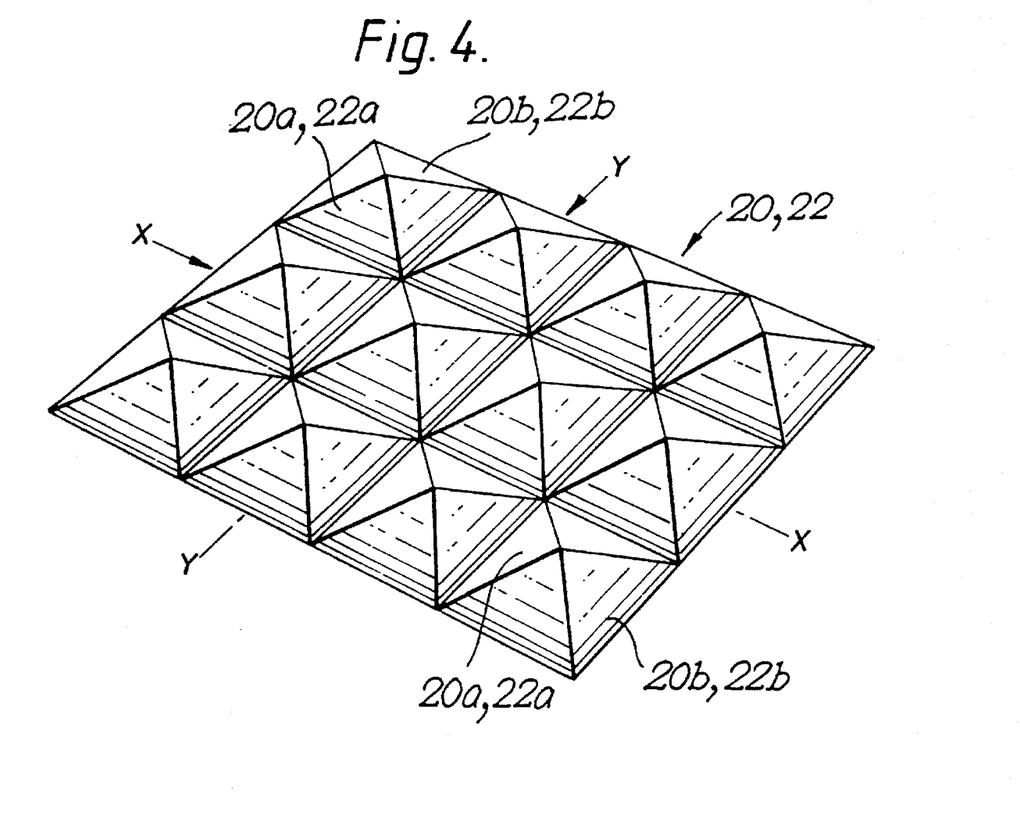
FIG. 4 is an isometric projection of a bi-directional form of sheet material suitable for use in the present invention.

FIG. 4 illustrates an alternative form of sheet material 20, 22 in which the corrugations or concertina arrangements are provided bi-directionally in order to form a structure as shown. This type of arrangement has the advantage of being much stronger than a uni-directionally corrugated or concertina shaped sheet and provides an improved blast absorbing capability. It will be appreciated that such a sheet is corrugated or concertina shaped when viewed in cross-section in the directions of arrows X or Y and hence any reference to corrugated or concertina shaped structures herein is considered to cover bi-directional or such similar structural arrangements as well. Any one, or more, of the sheets, 20, 22 or the expandable element 34 may take the form of a bi-directional or similar shaped structure if desired. Indeed the arrangement illustrated in FIG. 2, when incorporating one uni-directionally corrugated or concertina shaped sheet, and one bi-directionally corrugated or concertina shaped sheet will provide the panel with a high blast absorbing capacity.

An alternative form of bi-directional corrugation or concertina arrangement would be when a plurality of layers of panels 12 or 14 are arranged the one on top of the other such that their corrugations/concertinas extend in directions substantially orthogonal to each other. The wavelength of the corrugations/concertinas may vary on each panel or between panels so as to provide panels of different extended lengths- Such an arrangement would allow the panels to fail 'progressively' as each panel will extend a different amount before it fails. It allows the blast energy to pass through that panel and towards the next adjacent panel whose extended length would be somewhat greater so as to allow it to continue to extend as the blast panel as a whole distends. This concept of 'progressive failure' is particularly advantageous as each embedded panel can absorb its maximum blast wave energy before it fails without the catastrophic failure of the complete blast absorbing structure.

Figure 5:
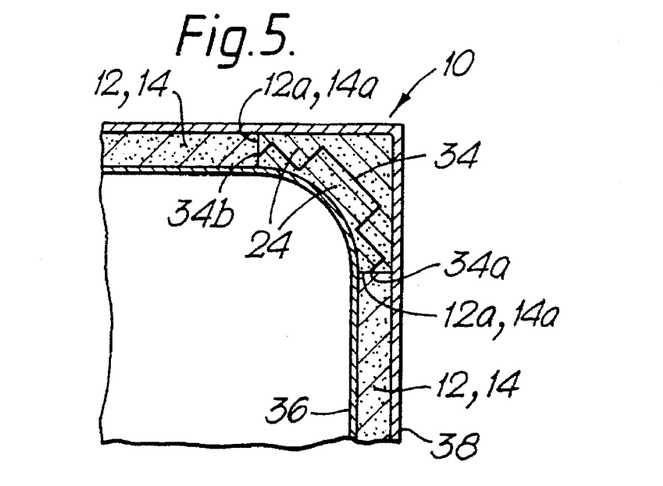
FIG. 5 is a cross-sectional view of a corner portion shown in FIG. 1.

FIG. 5 illustrates an edge or corner arrangement of the present invention. The panels 12, 14, which may each be provided with a blast absorbing structure as described above, are linked to an adjacent panel by a corrugated or concertina shaped expanding element 34. The element 34 is made from sheet material and may be provided with holes (not shown) therein for the purpose described above. The edges 34a, 34b of the element are connected to the edges 12a, 14a of the adjacent panel so as to anchor the panels together. Blast absorbing material 24 may be provided in the space between the element and protective inner and outer skins 36, 38 respectively. Element 34 may take the form of the sheet shown in FIG. 4 if desirable.

Figure 6:
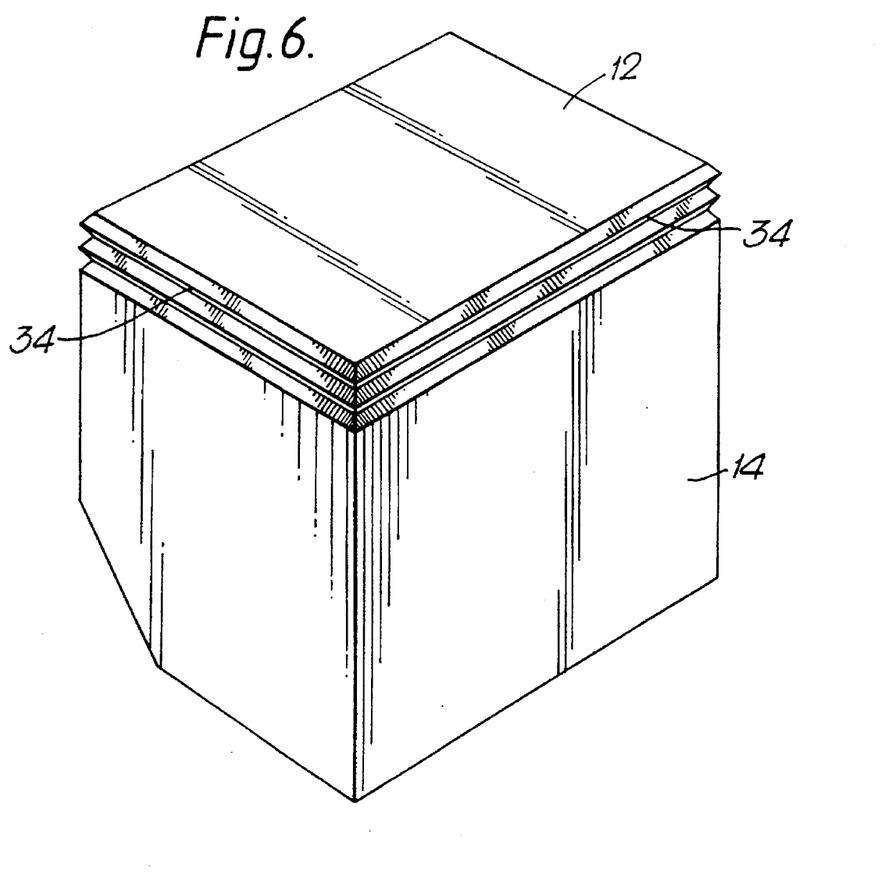
FIG. 6 is a pictorial representation of an aircraft cargo container according to another aspect of the present invention.

The edge, or corner, arrangement may be provided on all four edges of one or more panels as shown in FIG. 6. Such an arrangement gives the container 10 a bellows like structure the operation of which will be described below.

In operation, each of the above mentioned arrangements absorbs blast energy by causing the blast wave to do essentially expansive and compressive work thereby reducing the amount of blast energy which may emerge from the container to interact with the structure of the aircraft.

The arrangement shown in FIG. 2 operates by a combination of expansion of the sheets 20, 22 and compression of the blast absorbing material 26. A blast wave hitting the panel in the direction of arrow B acts to compress the blast absorbing material 24 and expand the corrugated or concertina shaped panels 20, 22 in the direction of arrows E, E. Lateral expansion of the panels acts to further compress the blast absorbing material 24 thereby further enhancing the overall blast absorbing capabilities of the structure. Holes 23, if provided, act to allow a portion of the blast energy to pass directly through the sheets and impinge directly on the blast absorbing material therebehind. The holes also help reduce the possibility of the sheets suffering structural failure if they experience excessive blast energy levels, as the extra blast energy passes through the holes rather than damage the panels themselves. An out of phase panel arrangement helps increase panel to blast absorbing material interaction. However, it will be appreciated that other phase relationships could be used without significantly altering the blast absorbing capabilities.

The FIG. 3 embodiment operates in substantially the same manner as that described above, with the exception of the extended end portions 30, 32. These portions, which are arranged to overlap one another, slide over each other when they experience an explosive blast wave thereby allowing frictional contact to be employed in blast mitigation. An adhesive layer, or another high friction material may be placed between the sheets to increase the friction therebetween. Lateral movement of the corrugated or concertina shaped portions will also take place as described above.

The operation of the edge/corner arrangement of FIG. 5, is also substantially the same as that described for the FIG. 2 embodiment. However, because the edges 34a, 34b of the element 34 are anchored to the adjacent panels 12, 14 they act to maintain the mechanical joint between the panels until the element itself bursts or ruptures due to the impact of the explosive blast energy.

If an edge/corner arrangement is employed along the entire length of each edge of one or more panels 12, 14, the container will take the form of a bellow, as shown in FIG. 6. In operation, this arrangement allows the entire panel 12, 14 to move whilst the blast wave expands the corrugated or concertina shaped elements 34 and crushes the shock absorbing material 24.

The above description provides a basic explanation of how the present invention 'absorbs' explosive blast energy by doing compressive work against the foam or other crushable material 24 and in straightening out the corrugations or concertinas in the blast panels 12, 14. Fundamentally, the blast wave energy is absorbed as elastic strain energy and plastic work on the expanding panel. This is entirely similar to the behaviour of a spring governed by Hooke's Law. However, for a better understanding of the principles involved the following, more detailed, mathematical explanation of said principles is provided.

The following paragraphs describe the operation of the blast mitigating aircraft cargo container through the explanation of the physical mechanisms underlying the operation of the composite blast panels from which it is constructed.

The approach is based on the recognition that as the blast wave spreads out from an explosive device inside the container it interacts with the sides of the cargo container and cause the sides to bow. That is, the blast wave does work on the structure, i.e., it expends energy, by expanding the sides of the container.

Physically, the material comprising the cargo container extracts so-called strain energy from the expanding blast wave as the wave does work on the panel. This may be interpreted as the area under the stress/strain curve.

It is this fundamental recognition that energy can be extracted from the blast wave by letting it do work on the panels of the cargo container which underlies the design principles of the cargo container.

The fundamental approach is based on a cargo container which is made of composite panels that are constructed to absorb the energy of the blast wave. The blast wave energy is absorbed as elastic strain energy and irreversible plastic work on the material comprising the panel.

To absorb the blast energy the panels must be made of an extensible material. The precise nature of the panel material, whilst affecting the performance characteristics of the cargo container to mitigate blast, will not preclude a discussion of the underlying principles which may be applied equally to panels of a metallic or polymeric construction.

Multilayered Panel Description

The panels of the cargo container are of a multilayered construction. For the purposes of this model description it is sufficient to consider a panel consisting of three sheets of material, not necessarily the same, between which is sandwiched a crushable material, e.g., vermiculite or foam. The panel construction is therefore of one inner and one outer sheet of resilient material, and an intermediate sheet which will be chosen to absorb the maximum amount of blast energy as the panel undergoes distention on blast loading. The crushable material is sandwiched between the intermediate sheet and the inner and outer ones respectively.

The purpose of the crushable material is to mollify the blast pressure waves which are transmitted into the panel. It also acts as a decelerating mechanism on the inner sheet as it is impulsively accelerated as the blast wave impinges on the panel; it also keeps the sheets from coming into contact.

Even this conceptually simple multilayered model panel presents a formidable challenge to analyse theorectically due to the disparate properties of the materials used in its construction. To enable the response of the panel to be characterised when deforming under blast loading, the panel may either be characterised by the properties of the principal energy absorbing constituent, or the panel materials may be homogenised to combine the material properties of the constituent materials to form an effective or equivalent material description. Prescriptions for homogenising the panel materials may be found in [1,2,3]—References.

In a more complex panel there may be a plurality of panels of different physical properties, and each of these panels may be separated by crushable material. This degree of complexity will not be discussed here, except to establish that the same approach of material characterisation or homogenisation may be applied to derive an effective or equivalent material description for the panel.

In the following analysis the material parameters are to be interpreted as characterising a panel of multilayered construction which have been derived in one of the methods previously discussed. To affect or optimise the material characteristics of a composite panel implicitly means affecting or optimising the physical properties of at least one of the materials comprising the panel.

Model Description

To describe the physics, we envisaged an idealised case in which the blast wave from an explosive device within the cargo container makes a circular footprint on the side panel of said container. We will assume that the blast loading over the circular footprint is uniform, and that elastic thin plate theory is applicable to analyse the response of the panel as it distends under blast loading.

Isotropic Panel

The simplest case which may be used to demonstrate the physical effects is that of a multilayered panel in which the effective material properites are isotropic.

From thin plate theory [1,2,3,4] the blast loading produces a bowing of the panel by a distance w from its undisturbed position given by, $$w = \frac{\bar{p}}{64D} (L^2 - r^2)^2 \text{ (in SI Units)} \tag{1}$$

where p is the (assumed) uniform pressure loading, L is the extent of the circular footprint, r is a radial co-ordinate measured from the centre of the circular footprint, and D is a material quantity called the flexural rigidity, viz., $$D = \frac{ET^3}{12(1-v^2)} \quad (2)$$

where E is Young's modulus, T is the thickness of the panel material, and v is the Poisson's ratio.

From equation (1) the maximum deformation of the panel is $$w = \frac{\bar{p}L^4}{64D} \quad (3)$$

Anistropic Panel

A more complex case to analyse, but one which is arguably more physically realistic, is for a panel whose effective material properties are anisotropic. Simplest amongst these, whilst being representative of a large class of materials, are those in which the effective material properties vary in two mutually orthogonal directions; such materials are called orthotropic. Examples of such materials include corrugated and rolled metal sheets, fillers in sandwich plate construction [1], and fibre reinforced composites [3].

For the case of such an orthotropic panel under blast loading, its deflection under an assumed uniform circular footprint of the blast wave is given by [1,2,3,4], $$w = \frac{\bar{p}}{64D_1}(L^2 - r^2) \quad (4)$$

where, $$D_1 = \frac{1}{8}(3D_x + 2H + 3D_y) \quad (5)$$

in which the anisotropic flexural rigidities are now direction dependent, and are expressed with respect to two mutually orthogonal coordinates denoted by the subscripts x and y, viz., $$D_x = \frac{T^3 E_x^1}{12(1-v_x v_y)} \quad (6)$$

$$D_y = \frac{T^3 E_y^1}{12(1-v_x v_y)} \quad (7)$$

$$D_{xy} = \frac{T^3 v_x v_y}{12(1-v_x v_y)} \quad (8)$$

and, $$H = D_{xy} + 2G_x \quad (9)$$

where, $$G_{xy} = \frac{1}{12}T^3 \quad (10)$$

in which $E^1_x$, $E^1_y$, G, $v_x, v_y$ are the plate moduli and Poisson's ratios. The quantity Gxy is called the torsional rigidity. Thus equation (4) applies to any orthotropic material characterised by the above set of material parameters.

The maximum deflection of the orthotropic panel may be deduced from equation (4), viz., $$w = \frac{\bar{p}L^4}{64D_1} \quad (11)$$

Energy Absorption

Consider the energy absorbed by the panel as it bows out under blast loading. Noting that the elastic strain energy (U) is equal to the work done on the panel, we may write $$U \sim \bar{p}L^2 w \quad (12)$$

which, on substituting for w from either equation (3) for an isotropic panel, or equation (11), for an orthotropic panel gives, $$U \sim \frac{\bar{p}^2 L^6}{64D^*} \quad (13)$$

where $D^*=D$, if the panel is isotropic, or $D^*=D_1$, if the panel is orthotropic.

Optimising Energy Absorption

Equation (13) is fundamental to understanding the energy absorption by the composite panel. Design factors which maximise this expression for the elastic strain energy of the panel act to extract the maximum blast wave energy from an explosive device detonated within the cargo container.

Equation (13) implies there are essentially two independent, but complementary approaches to maximising the blast wave energy absorbed by the panel as elastic strain energy.

Geometrical Optimisation

One means of optimising the energy absorbed by the panel is to increase the effective size of the panel which is subjected to blast loading. A means of achieving an increase in the effective length of the panel, whilst still remaining within the overall dimensional design envelope, is to introduce a corrugated or concertina sheet of material as the intermediate layer of our model composite panel.

A means of demonstrating that this acts to increase the capacity of the model composite panel to absorb blast wave energy is to consider the length of the corrugated or concertina panel, say $L^1$, and a panel of characteristic length L. Then since $L^1 > L$, by virtue of it being corrugated but constrained within the overall length of the panel, we deduce.

$$U^1 \sim \frac{\bar{p}^2 L^{1^6}}{64D^*} > U \sim \frac{\bar{p}^2 L^6}{64D^*} \quad (14)$$

Moreover, the increase in the capacity for blast energy absorption increases rapidly (the 6th power dependence) with increasing effective size of the intermediate sheet.

A more formal derivation of this conclusion may be obtained, using the rigidities for corrugated plates [1,2,4], in equations (4,5).

Materials Optimisation

The dependence of the blast absorbing capacity of the composite panel on material property may be inferred from equation (13), viz., $$U \sim \frac{v^2}{E^*} \quad (15)$$

where v is the Poisson's ratio and E* is the Young's modulus of the intermediate sheet of material within the model panel. Alternatively, these material properties could be taken as homogenised values.

Thus the capacity of the panel to absorb blast wave energy may also be optimised through suitable choice of materials. It is also clear that other factors such as the ultimate strain to failure and high-strain rate behaviour of the materials will also be factors which affect the selection.

It is clear, however, that geometry optimisation and materials selection are independent, but complementary aspects to optimising the energy absorbing capacity of the panel. The conclusion applies equally to the possible use of metallic or polymeric (composite) constituents of the panel.

Illustrative Example

To illustrate the foregoing analysis it is interesting to compare the energy in the blast wave with the capacity of the panel to absorb the energy. We have, $$\frac{\text{Elastic strain energy}}{\text{Blast wave energy}} \sim \frac{pL^4}{64D\lambda} \qquad (16)$$

By way of example, taking E–70 GPa and v–0.35 for an aluminium panel of a nominal 2 mm thickness and a characteristic dimension and wavelength of 1 m, we find D–53 Joules, which implies $$\frac{\text{Elastic strain energy}}{\text{Blast wave energy}} \sim 10^3 \qquad (17)$$

i.e., $$\text{Elastic strain energy} \gg \text{Blast wave energy} \qquad (18)$$

thereby implying the panel has the capacity to absorb the blast wave energy through the wave distending the panel.

Conclusion

The capacity for blast wave energy absorption through conversion to strain energy in the panel scales as the sixth power of the linear dimension of the panel, as indicated by equation (13). Thus the blast absorbing capacity of the panel can be increased quite considerably by small increases in its effective linear dimension. This has been noted in the patent through the use of extensible materials panels to increase the absorption capacity of the panel.

An additional mechanical approach based of the use of slip surfaces to reduce the blast wave energy by frictional dissiptation and to obviate the possible tendency of the panel to fracture under concentrated blast loading has also been raised within the patent. This has not been discussed within the context of the model, but is obviously complementary to it.

A quite separate issue to optimise the elastic strain energy capacity of the panel is material selection. Whether metallic or polymeric (composite) materials are used depends on detailed consideration of their material properties in the high-strain rate regime. However, material selection is left open at the present as it does not affect the underlying physical principles on which the blast wave energy is absorbed by the cargo container.

Returning now to the present invention, the material selection for the blast panels 12, 14, 62, 64 etc and the crushable/deformable material 24 will be dependent upon the particular individual application of the technique. However, it is felt that aluminium or a composite material having the correct flexural properties could advantageously be employed in any one of the blast panels or corner assemblies.

Figure 8:
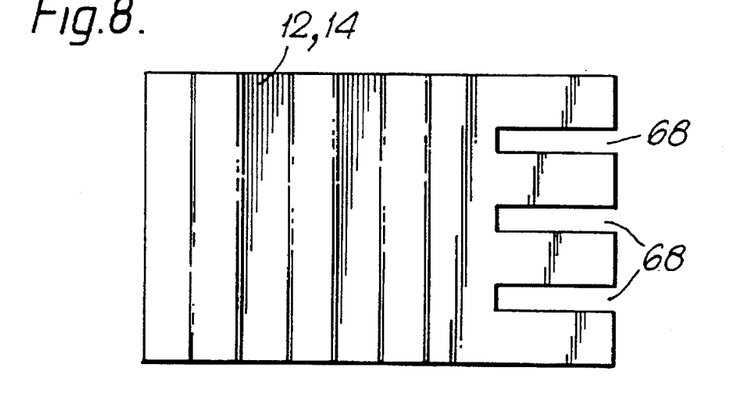
FIG. 8 is a detailed illustration of one of the expandable panels shown in FIG. 7 and, FIG. 9 is an alternative form of blast panel.
Figure 9:
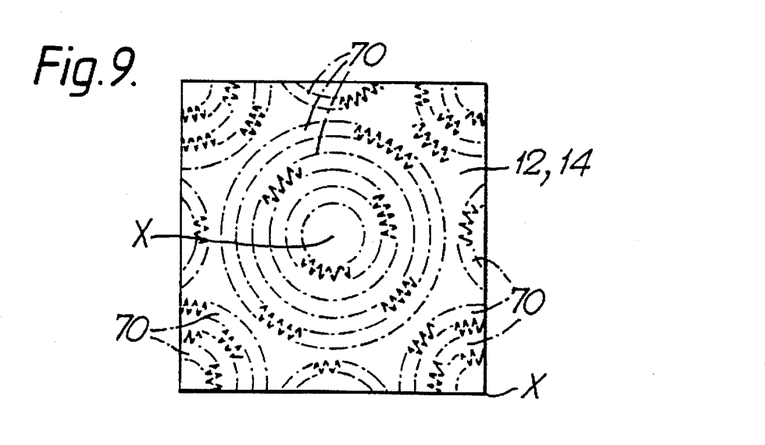

A still further alternative form of blast panel 12, 14 is illustrated in FIG. 9 in which the corrugations or concertinas are arranged in concentric rings 70 around a central point X such as for example the centre of the panel itself, or one or more of the corners, or a point adjacent an edge thereof. The arrangement illustrated in FIG. 8 will allow maximum extension at the point of maximum strain, ie the centre of the panel 12, 14, thereby ensuring maximum blast containment.

Figure 7:
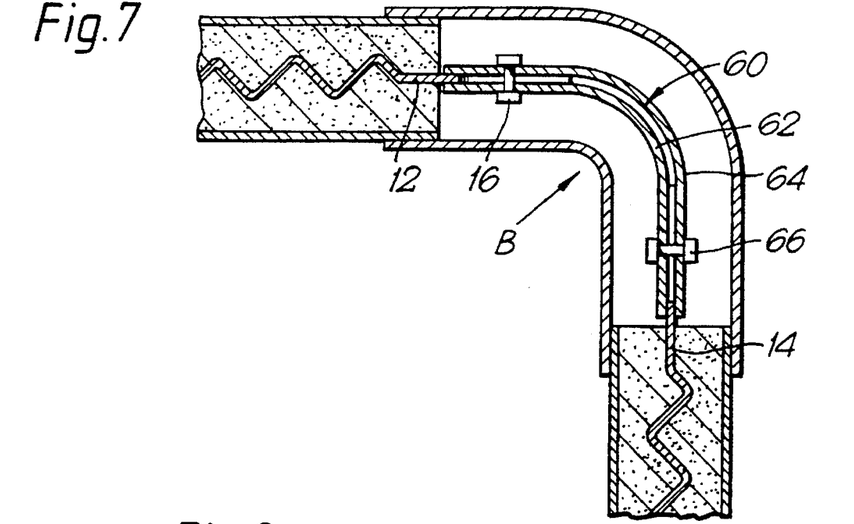
FIG. 7 is a cross-sectional view of an alternative corner arrangement.

A further corner arrangement is illustrated in FIG. 7. In this arrangement, the panels 12, 14 which may be provided with a blast absorbing structure as described above, are linked to an adjacent panel by a friction element 60. The friction element 60 comprises a pair of clamping corner panels 62, 64 between which the ends of panels 12, 14 are sandwiched. The friction element 60 is sized such that the panels 12, 14 are a tight fit therein. However it may be bonded to, or physically clamped around the panels 12, 14 so as to create a stronger corner which is more capable of resisting/absorbing blast loading.

FIGS. 7 and 8 illustrate a clamped arrangement of the above mentioned corner in which a plurality of fasteners 66, such as for example rivets or nut and bolt assemblies are used to clamp panels 12, 14 between the corner panels 62, 64. The fasteners 66 pass through slots 68 provided in the ends of panels 12, 14 in order to facilitate movement of the panels 12, 14 relative to the friction element. The slots 68, whilst illustrated as being open ended may be formed with closed ends if desired.

In operation, the above mentioned corner arrangement will expand when subjected to blast wave energy. The friction effect created by adhesive or the fastener arrangements acts to increase the blast absorbing properties of the overall structure as work must be done in order to overcome the bond strength/clamping force as panels 12, 14 slide from between corner panels 62, 64. As the slots are pulled out from between the friction element 60 they will be exposed to the blast wave thereby allowing a portion of said wave to pass through the structure so as to impinge on the material behind.

It will be appreciated that the above mentioned corner arrangement will allow progressive, rather than catastrophic, failure of the structure.

Figure 10:
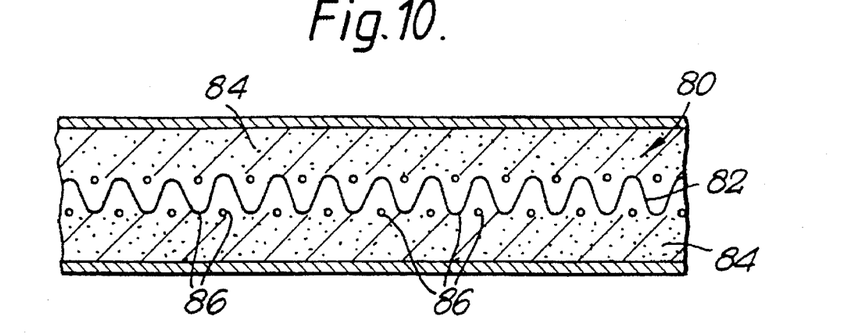
FIGS. 10, 11, 12 and 13 illustrates panels formed from composite materials.

Referring now to FIG. 10, this shows a blast attenuation panel having expandable regions; material substantially the same as that described with reference to FIG. 2, except that the corrugated or concertina shaped panels 20, 22 are replaced by a non-planar panel 80 of composite material comprising a woven fabric 82, encapsulated within a matrix 84. Alternatively, the composite material may be a knitted fabric. The woven fabric 82 may be composed of fibres or members 86 of aramid (e.g. Kevlar RTM), glass or a combination thereof. Aramid fibres have advantages in that they are more robust than glass, although glass may be preferred where cost is a significant consideration.

The woven fabric comprises a multiplicity of fibres 86, which are intertwined such that the embedded length of the fibres along at least one axis is greater than the length of the sheet 80 along that axis. The embedded length being controlled by the geometry of the weave. Preferably, the embedded length of the fibers along any axis is greater than the length of the sheet 80 along that axis.

The purpose of the matrix material is to increase the energy absorption capability of the fabric material as it elongates or expands under blast conditions.

The matrix material 84 may either an epoxy resin, a polymeric resin or an elastomer depending upon the blast attenuation properties required as will be discussed in greater detail below.

The panel material shown in FIG. 11 is again similar to that described with reference to FIG. 10 except that the woven fabric material 80 of FIG. 10 is replaced by a knitted fabric 88. The knitted fabric comprises a multiplicity of non-planar fibres 86 which are intertwined such that the embedded length of the fibres along any axis is greater than the length of the panel 80 along that axis. The embedded length is controlled by the geometry of the knit, and expansion of the fabric can occur in any axis—the degree of expansion in each axis being controlled by the knit pattern.

Figure 11:
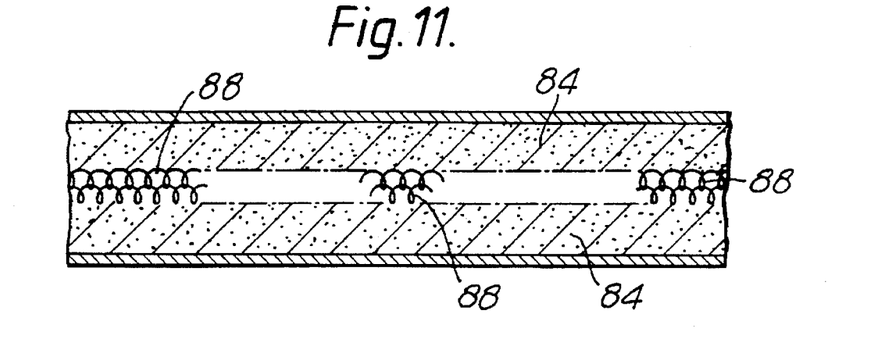

Examples of suitable aramid and glass fibre knitted fabrics include Fabric Nos. 9122 and 91155 respectively, available from Billon Freres of France. The fabric 88 is encapsulated in a matrix of polymeric resin, and similar fibre and resin materials to those used for the woven panel 80, in FIG. 10 may be employed.

Figure 12:
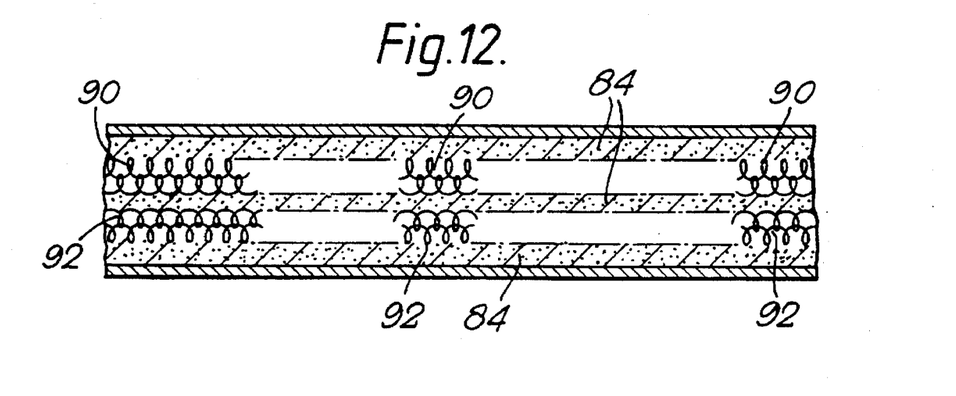

FIG. 12 shows a yet further embodiment of a suitable panel material to allow controlled, progressive expansion and failure under blast conditions as will be described in more detail below.

In this embodiment, the single fabric panel 82, 88 of FIGS. 10 and 11 respectively is replaced by two separate parallel panels 90, 92 laid side by side each of different fabrics and/or matrix materials to provide different load versus elongation characteristics.

Figure 13:
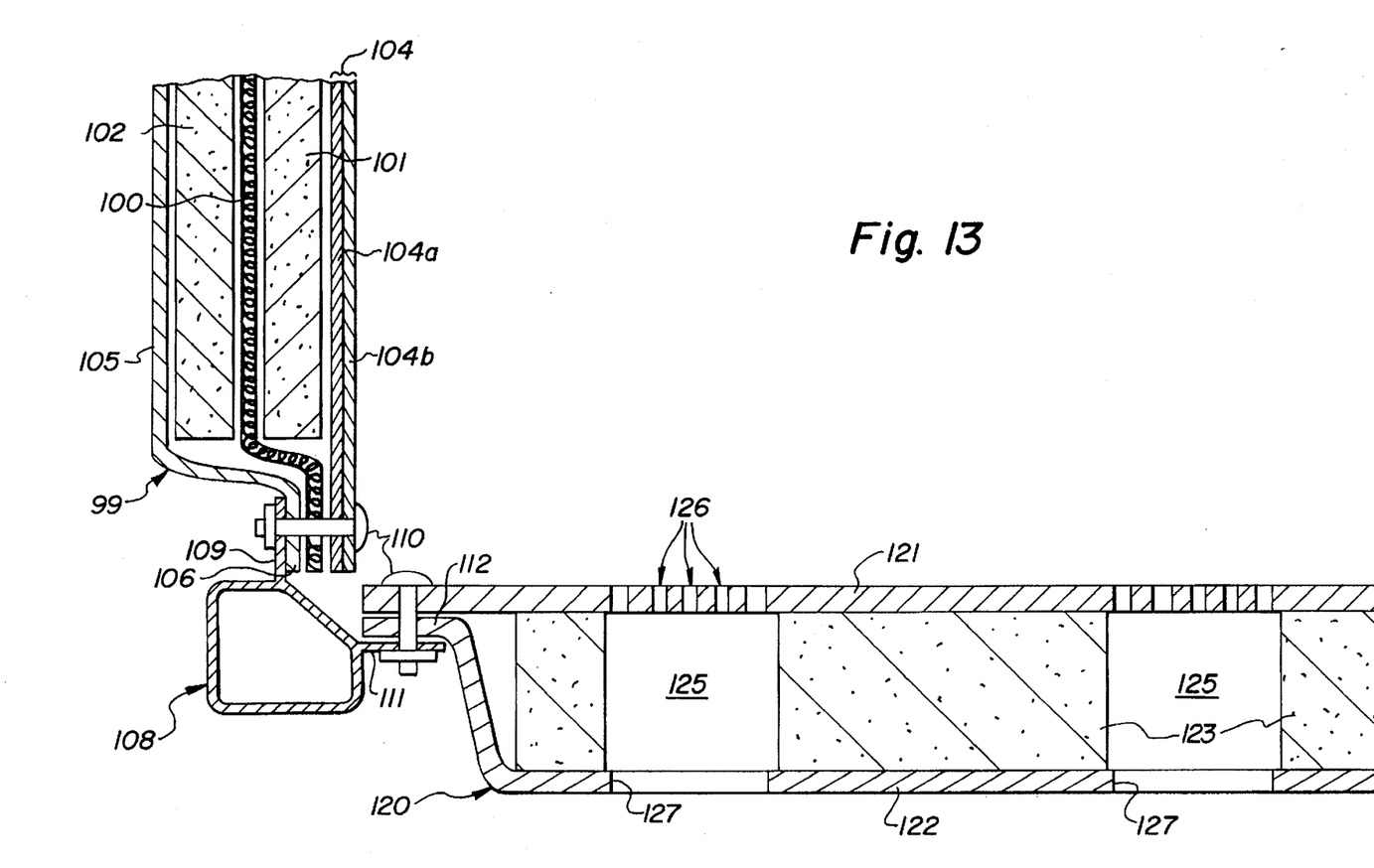

Referring now to FIG. 13, this shows a panel 99 of composite material generally in the form described with reference to FIG. 11 and specially adapted to provide a panel for a standard aircraft cargo container commonly designated LD3. The panel 99 is shown 1 providing a side wall of a container, and is attached to a floor panel 120 by means of a corner 1 joint 108 formed of extruded aluminium.

The panel 99 comprises a single sheet 100 of knitted aramid (Kevlar RTM) fibres sandwiched between respective layers 101,102 of foam material, themselves sandwiched between respective inner and outer skins 104, 105.

The sheet 100 of knitted aramid fibres is preferably of a knit geometry providing suitable elongation or expansion characteristics along all axes, and in this example comprises Fuchshuber-Tex Style 24185 (420 grams per square meter) manufactured and sold by Fuchshuber AG of Germany. Unlike the panels described with reference to FIGS. 10 to 12, the sheet 100 of knitted fabric is not encapsulated within a matrix material, but instead is adhesively bonded between the adjacent foam layers 101, 102 in a manner of which will be described in more detail below.

The inner skin 104 is of a material which is designed to disrupt and partially absorb the initial shock wave from an explosive device detonated within the container and then to allow the remaining blast wave energy to propagate into the other materials within the panel. The inner skin 104 must also be relatively tough and impact resistant to withstand the loading and unloading of baggage in normal use. Ideally it is also lightweight, flame retardant and impermeable so as to avoid the ingress of moisture into the panel material. In the present embodiment the skin 104 is provided by a two layer material comprising an inner sheet 104a of open-or-basket-weave glass fibre (eg Interglasgewebe Style 93160 available from Interglas AG of Germany) impregnated with resin, and bonded to a thin impermeable surface sheet 104b e.g. of polyvinyl fluoride (PVF), polyurethane or plyvinyl chloride (PVC). This surface sheet 104b is intended to perforate through the apertures of the basket-weave sheet 104a when subjected to blast gases, so that the latter disrupts the initial shock wave and then to yield to allow the ensuing blast wave energy to propagate the interior of the panel to facilitate the blast absorption process.

The inner layer of foam 101, located between the knitted Kevlar (TM) sheet 100 and the inner skin 104, comprises a compressible elastically deformable closed cell foam material eg of polyethylene, approximately 9 mm thick and of relatively low density. A suitable material is that designated Plastazote 45FR(™) and supplied by Zotefoams Ltd of the UK. Other suitable materials may be used. The inner foam layer 101 serves firstly to absorb some of the shock wave energy upon compression and secondly to protect the knitted Kevlar(™) sheet 100 by ensuring a more even distribution of blast wave energy loading. It is also required to be relatively durable to impact and compression from baggage loaded into the container, and for this reason elastically deformable non-friable foams are preferred, particularly those having a density of less than 50 kg·m$^3$ and a compressive strength at 25% strain in excess of 50 kPa.

The outer layer of foam material 102, located between the knitted Kevlar(™) sheet 100 and the outer skin 105, has increased mechanical properties in terms of compressive and flexural strength, and at 10 mm is of approximately the same thickness as the layer 101. It comprises a closed cell permanently deformable foam, e.g. of PVC, which is relatively stiff to provide the panel with some rigidity. Accordingly flame retardant materials having a compaction strength in excess of 500 kPa and a density less than 100 kg/m$^3$ are particularly suitable, for example that provided by Divinycell International Ltd in the UK under the designation Divinycell H45(™).

Finally, the outer skin 105 is of a lightweight rigid impermeable material having significant tensile strength, in this case 0.8 mm thick aerospace grade aluminium sheet formed into the shape of a shallow dish to provide an impact resistant weather proof encapsulation for the other materials of the panel. Each of the layers 100 to 105 of the panel is adhesively bonded to the adjacent layer by means of a double-sided adhesive sheet (not shown) such as that sold by Fasson UK Ltd under the trade name Fastape™, (TM), to provide a unitary substantially rigid composite structure. Alternative bonding techniques may also be used.

In order to enable the edges of the panel 99 to be connected e.g. to other panels or to door frames of the container, and to provide a secure anchorage for the knitted Kevlar(™) sheet 100 around the edges of the panel, the outer aluminium skin 105 is formed around its edges with flanges 106. The flange 106 along the bottom edge of the panel is viewed as shown securely connected to a similar flange 109 of the corner joint extrusion 108 by means of uniformly spaced rivets or bolts 110 which also penetrate through all the other layers of the panel to provide a secure anchorage for the panel along its entire edge. The other edges of the panel 99 will in use be similarly connected to edge, corner or frame members as appropriate in the construction of the container.

The container floor panel 120 to which the panel 99 is attached is of a different construction, being required to bear significantly greater loads. It comprises a planar inner load-bearing layer 121 of 2.7 mm thick 6082 grade aluminium and a shallow dish shaped outer layer 122 similar to the outer skin 105 of the panel 99, and similarly formed around its edges with a flange 112. The two layers 121, 122 are joined to one another around their edges and, as shown, are anchored to flange 111 of the corner joint by means of space rivets or bolts 111 in identical manner to the panel 99. The two layers 121, 122 are also spaced apart by stiffening foam spacers 123 arranged in any suitable configuration to provide open passages 125 between them. Regions of the inner floor layer 121 aligned with these passages 125 are perforated with holes 126, whilst corresponding regions of the other skin 122 of the floor panel 120 are formed with apertures 127 to provide passages through which blast gases from within the container can vent to further assist in the blast management process. The apertures 127 may in turn communicate with further ducts (not shown) formed, e.g. in the base of the container, to redirect the blast gases in a safe direction.

The container may also be partially or completely enclosed within a lattice of high tensile strength straps (not shown) similar to those used in automatic seat belts. These operate in the manner of a string-bag to provide an additional tensile resistance to over-expansion and deformation of the container structure under blast conditions, thus absorbing further blast energy and preventing or delaying the disintegration of the container. The straps may be anchored to the base of the container or wound around the entire periphery of the container in any or all axes.

Whilst the blast attenuating panel 99 has been described using specific materials and dimensions formed to meet the behaviour requirements and to operate more effectively in their application to an LDP cargo container, it will be appreciated that within the scope of the present invention other lightweight preferably fire-retardant or fire-resistant materials having the same or similar properties may also be employed. For example for the foam layers 101, 102 other foam materials such as phendic foams, polyisocyanurate (PIUR) foams or ethylene vinyl acetate (EVA) foams may also be utilised, particularly where strength and durability is a less important criterion.

Figure 14:
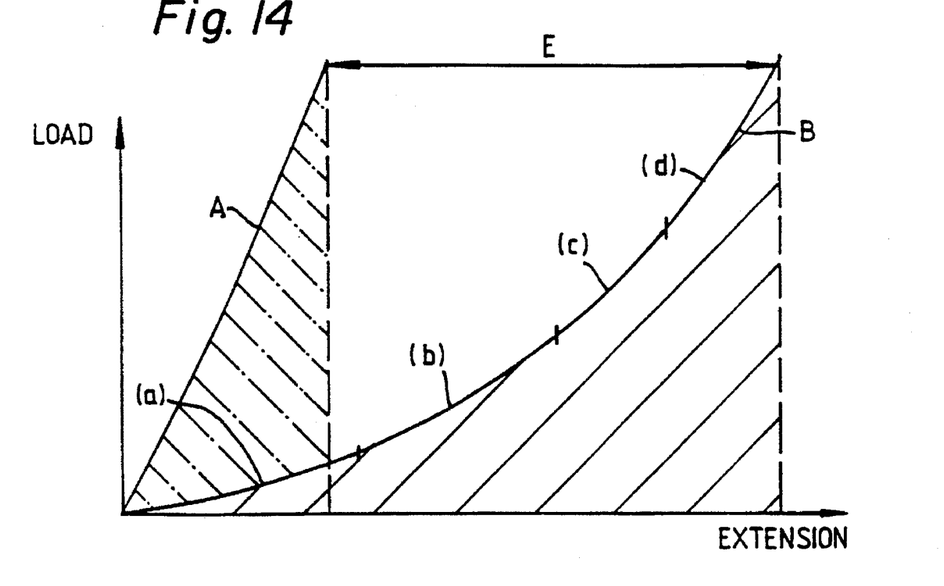
FIG. 14 is a comparison graph of load versus extension of a fabric similar to those described with reference to FIGS. 10 to 12 (curve B) with that of a sheet comprising similar fibres encapsulated in a matrix and running parallel and straight (curve A)

Referring now to FIG. 14, which compares a typical load versus extension curve of a fabric panel similar to those described with reference to FIGS. 10 to 12 (curve B), with that of a panel comprising similar fibres encapsulated in a matrix and running parallel and straight (curve A).

It will be seen that the curve A for the straight fibre sheet is fairly steep and substantially linear representing simple stretching of the fibres to break point. In contrast, curve B for the knitted fabric sheet is relatively shallow providing an increase in extension E which is primarily governed by the geometry of the fabric knit.

The length and slope of portion (a) of curve B, which represents the initial phase during which the resin matrix undergoes elastic deformation, is controlled by the matrix type and formulation. For example, a resin matrix such as a toughened epoxy (e.g. ACG LTM 22 manufactured by Advanced Composites Group ltd would offer in the region of 5–6% elongation of the matrix material during this elastic deformation phase. On the other hand, a matrix such as silicone or polyurethane would offer an elongation of up to 50% with a much lower slope.

The length and slope of portion (b) of curve B, represents and is dependent upon the failure mode of the matrix. In this connection, the epoxy resin material ACG LTM 22 offers a progressive failure over an elongation of about 15%.

Portion (c) of curve B represents elongation of the sheet as a result of continued straightening of the parent fibres of the fabric sheet, and is determined by the knit geometry of the fabric.

Finally the portion (d) of curve B represents the final fibre stretch of the individual fibres of the material during which they deform elastically prior to ultimate failure. A typical ultimate load figure equates to a strength of about 3150 MPa for aramid fibres.

The area under each curve A, B represents the total energy absorbed by the material in extension, e.g. during and following impact of a blast wave. The greater the area under the curve, the more energy is absorbed from the blast. The combination of matrix and fibre properties described above is optimised to give the maximum area under the curve for a given explosive charge size and permissible elongation of panel. Note that the area under curve B is significantly greater than that under curve A.

The operation of the panel material described with reference to FIG. 13 is similar to that described with reference to FIG. 14 in relation to the panel materials of FIGS. 10 and 11, except that, because the knitted fabric layer 100 is not actually encapsulated within a resin matrix, but is instead sandwiched between the bonded to the adjacent foam layers 101, 102, the extension versus load characteristic is different. In particular the initial parts (a) and (b) of this curve will be rather shallower, whilst section (c) and (d) will be steeper. Such characteristics serve to reduce the shock tension at the anchorage of the panel 99 around its edges thereby reducing the risk of premature failure of these joints. The steeper sections (c) and (d) of the characteristic are representative of a material providing energy absorption within a smaller expansion envelope around the container. Thus it will be seen that the expansion versus load characteristic of the sheet material 100 can be varied to ensure the maximum energy absorption occurs within any given expansion envelope.

The mechanism by which the above described panel 99 operates to absorb blast energy upon detonation of an explosive device within the container is understood to be substantially as follows. The initial shock wave hits the inner skin 104 and punctures the thin surface sheet 104a through the apertures in the underlying open-weave layer 104b. As it propagates through this skin 104, the shock wave is disrupted due to the different propagation speeds through the apertures and the weave itself.

Depending upon the proximity of the explosive device, the effect of the ensuing blast wave pressure impinging upon the skin 104 is to either cause it to rupture or to break or tear from its anchorage around the edge of the panel, thus allowing the blast wave to propagate into the inner layer of foam 101 which is compressed thereby slowing down the blast wave and absorbing more energy. This inner layer of foam 101 also protects the knitted Kevlar(™) sheet 100 by spreading the blast wave load more evenly rather than at any isolated point or points on the surface of the sheet 100.

Blast pressure impinging on the knitted sheet 100 is then absorbed by a number of mechanisms. Firstly, stretching and elongation of the sheet 100 as the individual fibres of the knit are straightened out and initially stretched within their elastic limit; secondly compression of the outer layer of foam 102; expansion and possible rupture of the outer aluminium skin 105; and finally expansion of the knitted sheet 100 beyond its elastic limit.

Figure 15:
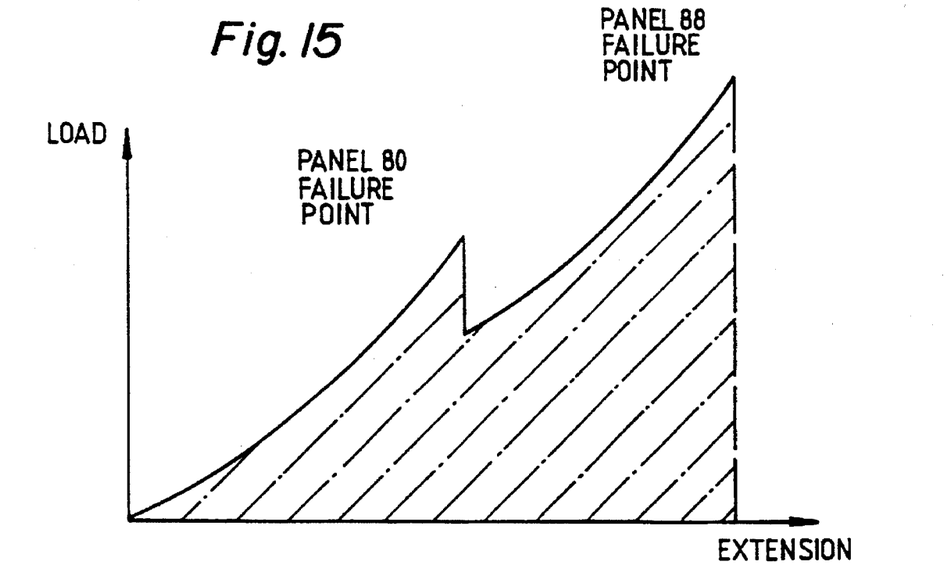
FIG. 15 shows a corresponding curve for a panel embodying two adjacent panels.

Referring now to FIG. 15, this shows a corresponding curve for a panel embodying two adjacent parallel fabric panels such as panels 90, 92 in the embodiment shown in FIG. 12. Each panel has a different load versus elongation characteristic so as to provide the curve with its own respective failure point. In this way the overall area under the curve is substantially increased indicating a substantial increase in the energy absorbed from the blast wave whilst also providing a progressive elongation and failure sequence for the panel as a whole.

The different load versus extension characteristics for each of the two panels can be achieved in a variety of ways e.g. by varying the matrix material, the fibre material and/or the knit of the fabric. A similar effect to the use of two parallel panels of dissimilar material may be achieved in a single panel through the use of two different fibres in the knit, where one fibre has a lower failure load than the other. Alternatively or additionally, more than two panels may be used to provide an even greater energy absorption characteristic.

Finally, although the load versus extension curves shown in FIGS. 13 and 14 have been described with reference to panels incorporating fabric, similar principles apply in relation to concertina or corrugated shaped panels of the kind described with reference to FIGS. 1 and 2.

REFERENCES

[1] *Stresses in Plates and Shells*, A. C. Ugural, McGraw-Hill, 1981

[2] *Anistotropic Plates* S. G. Lekhnitskii, Gordon and Breach, 1968.

[3] *Composite Materials and their use in Structures* J. R. Vinson and Tsu-Wei Chou, Applied Science Publishers, 1975.

[4] *Stiffened Plates: Bending, Stability and Vibrations* M. S. Troitsky, Elsevier Scientific, 1976.

While the invention has been particularly shown and described with reference to preferred embodiments and alterations thereto, it should be understood by those skilled in the art that various changes in form and detail may be made therein without departing from the spirit and scope of the invention.

What is claimed is:

1. A container comprising a plurality of panels, at least one of said plurality of panels having a blast attenuation means, said attenuation means comprising an expandable region for expansion under blast loading thereby absorbing a portion of a blast energy contained in a blast, said expandable region comprising one of a sheet of woven fabric material and a sheet of knitted fabric material expandable in a lateral direction, said fabric material being encapsulated within a matrix wherein an embedded length of fibers of one of the sheet of woven fabric material and a sheet of knitted fabric material along any axis within the material is substantially greater than a length of the material along the axis, wherein the plurality of panels forms a closed container.

2. A container according to claim 1, wherein the matrix is one of a polymeric resin and an elastomer.

3. A container according to claim 2, wherein the matrix is an epoxy resin.

4. A container according to claim 3, wherein the fabric material comprises high tensile strength fibers.

5. A container according to claim 4, wherein the high tensile strength fibers are one of aramid, glass and a combination thereof.

* * * * *